United States Patent Office 3,548,663
Patented Dec. 22, 1970

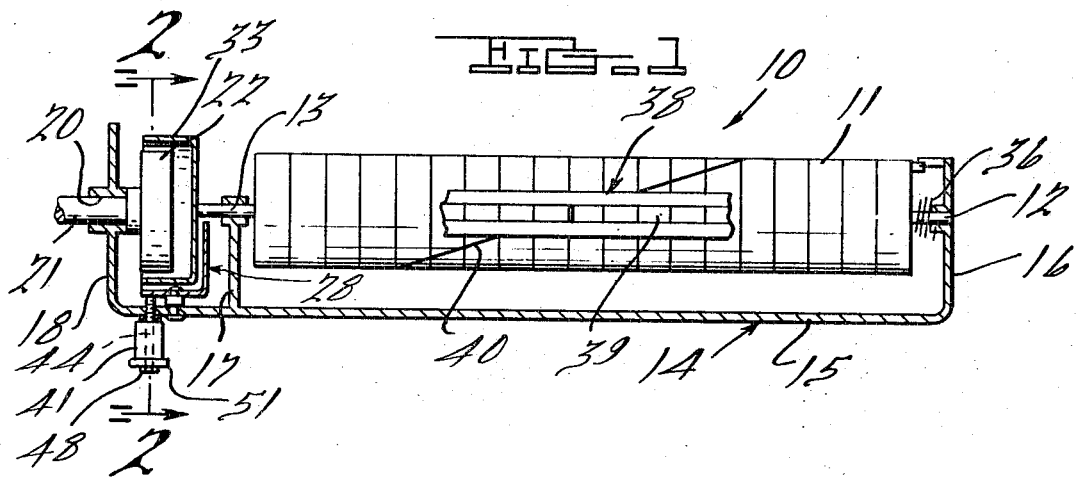

3,548,663
ELECTRICAL GENERATOR INCLUDING COMPONENTS OF AN AUTOMOTIVE VEHICLE MECHANICAL SPEEDOMETER
Bernard G. Radin, Oak Park, Mich., assignor to Ford Motor Company, Dearborn, Mich., a corporation of Delaware
Filed July 31, 1968, Ser. No. 749,090
Int. Cl. G01p 3/54
U.S. Cl. 73—510     5 Claims

ABSTRACT OF THE DISCLOSURE

An electrical generator for producing periodically varying electrical energy useful in automotive vehicle applications and having a frequency proportional to vehicle speed in which the electrical generator comprises a magnetic means preferably in the form of a permanent magnet having a plurality of poles coupled to a shaft that is driven at a speed proportional to vehicle speed. This magnetic means or permanent magnet forms a portion of a mechanical speedometer of the automotive vehicle that in addition has a pole face or flux collector radially spaced from the permanent magnet and means interposed between the permanent magnet and the pole face or flux collector for producing a torque that drives a vehicle speed indicating device. A coil or output winding and ferromagnetic means coupled to the coil are mounted on the speedometer for intercepting flux leakage from the permanent magnet and the pole face or flux collector of the speedometer mechanism. As the magnetic means or permanent magnet is rotated at a speed proportional to vehicle speed, magnetic flux coupling the coil is varied in time and produces a periodically varying output in the coil or output winding having a frequency proportional to vehicle speed.

BACKGROUND OF THE INVENTION

This invention provides a means for generating periodically varying electrical energy having a frequency proportional to vehicle speed that may be used as a control signal for other mechanisms in the vehicle particularly for an electronic automatic speed control system.

There have been many electrical generators developed in the prior art for producing an output voltage having a frequency proportional to vehicle speed. The output voltage from these generators may be used to perform different control functions in the automotive vehicle including providing an input signal to an electric or electronic automatic speed control system.

The electrical generators known in the prior art for producing a control voltage useful in automotive devices have usually been separate electrical generators which employ their own output windings, magnetic fields and mechanical components for causing relative rotation between the magnetic field and output windings. As a result, these separate components are costly and need to be separately mounted in some convenient position within the automotive vehicle. In many cases these electrical generators are driven directly from the wheels of the vehicle and are positioned adjacent thereto, or are positioned somewhere in the driveline and are operated at a speed proportional to vehicle speed.

In other prior art mechanisms known to the applicant, such electrical generators are positioned in a two-part electrical speedometer cable in which the standard speedometer cable is split and drives a permanent magnet of an electrical generator. This generator has separate output windings for producing a voltage proportional to vehicle speed as the speedometer shaft is rotated. These generators also have coupling means that couple the two portions of the speedometer cable so that the speedometer drive shaft may be driven at a speed proportional to vehicle speed.

The present invention provides a very uncomplicated and inexpensive electrical generator for producing periodically varying electrical energy having a frequency proportional to vehicle speed. The electrical energy produced may be employed with various control systems in an automotive vehicle, particularly, with an electric or electronic automatic speed control system. This is accomplished by using the magnetic means of a mechanical speedometer located in the vehicle which produces the time varying flux necessary for the creation of periodically varying electrical energy having a frequency proportional to vehicle speed.

SUMMARY OF THE INVENTION

In the present invention an electrical speedometer is provided having a housing or frame constructed of non-ferromagnetic material. A magnetic means, preferably in the form of a permanent magnet having a plurality of pole pieces, is affixed to the speedometer shaft. The speedometer shaft is driven at a speed proportional to vehicle speed. A pole face or flux collector constructed of ferromagnetic material, preferably in the form of a half cylinder, is affixed to the speedometer frame. Means are interposed between the magnetic means, preferably in the form of a permanent magnet, and this pole face or flux collector for producing torque that will drive an indicating means for indicating vehicle speed.

A coil or output winding is positioned on the frame of the speedometer and is coupled to ferromagnetic means that intercepts the changing magnetic flux from the above described components. Preferably, this ferromagnetic means comprises a mounting means passing through the coil or output winding and contacting the ferromagnetic pole face or flux collector of the speedometer. It may also include a separate ferromagnetic shoe positioned at the opposite end of the coil or output winding. This ferromagnetic means may comprise a bolt which passes through the speedometer frame and affixes the coil and the pole shoe to the frame.

As the permanent magnet of the speedometer is rotated by the speedometer shaft at a speed proportional to vehicle speed, the changing magnetic flux from the speedometer system and, more particularly, from the ferromagnetic pole face or flux collector of the speedometer mechanism varies the magnetic flux linking the coil or output winding. This induces in the coil or output winding a periodically varying voltage having a frequency proportional to the angular speed or velocity of the permanent magnet or magnetic means of the speedometer and hence proportional to vehicle speed.

BRIEF DESCRIPTION OF THE DRAWINGS

FIG. 1 is a longitudinal cross-sectional view partially in elevation of the speedometer mechanism and electrical generator of the present invention.

FIG. 2 is a sectional view taken along the lines 2—2 of FIG. 1.

DESCRIPTION OF THE PREFERRED EMBODIMENT

Referring now to the drawings in which like reference numerals designate like parts throughout the several views thereof, there is shown in FIG. 1 a speedometer 10 for an automotive vehicle which is of the drum type having a drum 11 that indicates vehicle speed in the conventional manner. The drum 11 has affixed thereto a first axially extending shaft 12 and a second axially extending shaft 13 that are mounted in a frame, generally designated by the numeral 14. The frame is constructed of a nonferromagnetic material and has a generally arcuate shaped main body portion 15 and upstanding end walls 16 and 17 within which the axially extending shaft 13 and 14 of the drum 11 are rotatably journaled.

The frame 14 also has an upstanding end wall 18 which rotatably receives at 20 a shaft 21 which has attached thereto a magnetic means, preferably in the form of a permanent magnet 22. As shown in the drawings, the permanent magnet 22 is cylindrical in shape and is polarized at circumferentially spaced points around the periphery thereof to form north and south magnetic poles 23, 24, 25 and 26. It is readily apparent that the exact shape and number of poles of the permanent magnet 22 is not essential to the operation of the invention.

The shaft 21 is adapted to be driven at a speed proportional to vehicle speed and may be driven, as is conventionally done, through a speedometer cable having one end affixed to the shaft 21 and the other end coupled to a rotating gear in the transmission of the vehicle. A magnetic pole face or flux collector constructed of ferromagnetic material and generally designated by the numeral 28 has a first wall 29 and a second wall 31 generally positioned at right angles or perpendicularly with respect to one another. The pole face or flux collector 28 is preferably constructed of steel and is affixed to the arcuate main body portion 15 of the frame 14 by a suitable fastening means such as a rivet 32.

An eddy current drag cup 33 is interposed between the magnetic means or permanent magnet 22 and the pole face or flux collector 28. This eddy current drag cup is constructed of a highly conductive nonmagnetic material, such as, aluminum or copper.

As the magnetic means or permanent magnet 22 is rotated, a magnetic circuit is set up between the north and south poles of the permanent magnet that exends through the eddy current drag cup 33 and through the pole face or flux collector 28. For example, a magnetic circuit between south pole 23 and north pole 26 is completed through the air gap separating the eddy current drag cup 33 and the permanent magnet 22, through the eddy current drag cup 33, through the air gap separating the eddy current drag cup and the pole face or flux collector 28. The flux then travels around the pole face or flux collector 28, across the air gap separating the pole face or flux collector 28 and the eddy current drag cup 33, through the eddy current drag cup 33, across the air gap separating the eddy current drag cup 33 and the north pole 26 of the magnetic means or permanent magnet 22. The rotation of the magnetic means or permanent magnet 22 sets up eddy currents in the highly conductive nonmagnetic material of the eddy current drag cup 33. These currents produce magnetic flux that cooperates with the magnetic flux from the permanent magnet 22 to cause a torque to be applied to the eddy current drag cup 33 which in turn is applied to the shaft 13 of the drum 11. This torque is proportional to vehicle speed and is resisted by a hair spring 36 connected at one end to the upstanding wall 16 of the frame 14 and at the other end to the drum 11. A standard viewing means shown partially at 38 and including a lens 39 cooperates with a line 40 on the drum 11 to provide an indication of the vehicle speed.

The electrical generator of the present invention includes a coil or output winding 41 having a specified number of turns of highly conductive wire which is generally cylindrical in shape and has a central opening 42 positioned therethrough. The wire of the output winding or coil 41 may be suitably wound on a plastic bobbin 43. A ferromagnetic means couples the coil 41 with the magnetic circuits set up by the permanent magnet 22, through the eddy current drag cup 33 and the pole face or flux collector 28. This ferromagnetic means may comprise a means 44 extending axially through the opening 42 in the coil or output winding 41 and through the bobbin 43 and it extends through the nonferromagnetic material of the arcuate shaped main body portion 15 of the frame 14 and into close proximity to the wall 29 or in engagement with it, as shown, of the pole face or flux collector 28. This ferromagnetic means 44, preferably, is a fastening means for fastening the coil 41 and bobbin 43 to the arcuate main body portion 15 of the frame 14 and may take the form of a steel bolt having threads 45 that are threaded into a threaded opening 46 in the arcuate main portion 15 of the frame 14. The end 47 of the bolt or ferromagnetic means 44, preferably, extends into engagement with the wall 29 of the pole face or flux collector 28, but this need not be the case. It is only necessary that the end 47 of the ferromagnetic means or bolt 44 be in proximity to and sufficiently close to the wall 29 to receive leakage flux. The head 48 of the ferromagnetic means or bolt 44 may be used to trap a pole shoe 51 made of ferromagnetic material and which is preferably of annular configuration.

In operation as the shaft 21 rotates the magnetic means or permanent magnet 22, magnetic flux passes from one of the poles of the permanent magnet 22, for example, north pole 26, through the circuit previously described for operating the eddy current drag cup 33 and back to the south poles 23 and 25. A portion of the magnetic flux in the wall 29 of the pole face or flux collector 28 goes into the end 47 of the ferromagnetic means or bolt 44. This flux then passes axially through the ferromagnetic means or bolt 44 and out through the pole shoe 51 and is then returned through an air path to an opposite pole, for example, south poles 23 and 25 of the permanent magnet 22. This flux may pass through the arcuate main body portion 15 of the frame 14 which is constructed of a nonferromagnetic material. As the permanent magnet 22 is rotated, it can readily be seen by reference to FIG. 2 that the flux through the wall 29 of the pole face or flux collector 28 adjacent the end 47 of the ferromagnetic means or bolt 44 changes in time and its direction reverses as alternate poles come into close proximity to the end of the ferromagnetic means or bolt 44. This rate of change is proportional to the strength and speed of the magnetic means or permanent magnet 22. This changing magnetic flux passes through the ferromagnetic means or bolt 44, the pole shoe 51 and is returned to the permanent magnet 22 as described above. This changing flux links the coil or winding 41 and it has induced in it a periodically varying electrical energy output which has a magnitude proportional to the angular speed of the magnetic means or permanent magnet 22.

Additionally, the frequency of the periodically varying electrical energy output of the coil or output winding 41 is proportional to the angular velocity of the magnetic means or permanent magnet 22 since the rate at which the north and south poles pass in the immediate vicinity of the ferromagnetic means 44 is proportional to the rotational speed of the permanent magnet 22.

The above described structure, therefore, provides a very inexpensive and uncomplicated electrical generator for use in an automotive vehicle, the output of which has a frequency proportional to the vehicle speed. This output may be used for control purposes with other mechanisms in the automotive vehicle, particularly, an automatic electronically operated speed control system. Moreover, it uses the magnetic system of a mechanical speedometer for the automotive vehicle for generating the changes of flux necessary to produce this alternating electrical energy output. The electrical generator includes many components that are already present in an automotive vehicle. This results in a substantial cost savings in both material and assembly time for the electrical generator.

The invention disclosed will have many modifications which will be apparent to those skilled in the art in view of the teachings of this specification. It is intended that all modifications which fall within the true spirit and scope

What is claimed is:

1. An electrical generator for producing periodically varying electrical energy having a frequency proportional to vehicle speed comprising a mechanical speedometer having a frame, a shaft journaled in said frame and adapted to be driven by means rotatable at a speed proportional to vehicle speed, a permanent magnet having a plurality of magnetic poles coupled to said shaft, ferromagnetic means radially spaced from said permanent magnet, means interposed between said permanent magnet and said ferromagnetic means, said permanent magnet and said ferromagnetic means cooperating with said means for applying a torque to said means, speed indicating means attached to said means for indicating vehicle speed as a function of the torque applied to said means, an output winding mounted on said frame, ferromagnetic means magnetically coupling said output winding and positioned adjacent said ferromagnetic means of said speedometer for intercepting flux leakage from said ferromagnetic means of said speedometer for causing a changing magnetic flux coupling said output winding as said permanent magnet is rotated whereby periodically varying electrical energy is induced in said output winding having a frequency proportional to vehicle speed, said ferromagnetic means magnetically coupling said output winding including a bolt, said output winding mounted on said bolt, said frame having a threaded opening positioned adjacent said ferromagnetic means of said speedometer mechanism, said bolt being threaded into said frame in a position where one end thereof is positioned adjacent said ferromagnetic means of said speedometer.

2. The combination of claim 1 in which an annular pole piece constructed of ferromagnetic material is positioned in engagement with the other end of said bolt.

3. The combination of claim 2 in which said annular pole piece is clamped between the head of said bolt and one end of said output winding.

4. An electrical generator for producing periodically varying electrical energy having a frequency proportional to vehicle speed comprising a mechanical speedometer having a frame, a shaft journaled in said frame and adapted to be driven by means rotatable at a speed proportional to vehicle speed, a permanent magnet having a plurality of magnetic poles coupled to said shaft, ferromagnetic means radially spaced from said permanent magnet, means interposed between said permanent magnet and said ferromagnetic means, said permanent magnet and said ferromagnetic means cooperating with said means for applying a torque to said means, speed indicating means attached to said means for indicating vehicle speed as a function of the torque applied to said means, an output winding mounted on said frame, ferromagnetic means magnetically coupling said output winding and positioned adjacent said ferromagnetic means of said speedometer for intercepting flux leakage from said ferromagnetic means of said speedometer for causing a changing magnetic flux coupling said output winding as said permanent magnet is rotated whereby periodically varying electrical energy is induced in said output winding having a frequency proportional to vehicle speed, said output winding having a central opening therein and said ferromagnetic means magnetically coupling said output winding and positioned adjacent said ferromagnetic means of said speedometer including means passing through a central opening in said output winding and means extending outwardly beyond said output winding and positioned over the end of said output winding opposite said frame.

5. The combination of claim 4 in which said means passing through said central opening in said output winding comprises fastening means for mounting said output winding on said frame and said means extending outwardly beyond said output winding comprises a pole shoe of ferromagnetic material positioned between said fastening means and said output winding and extending in a direction substantially perpendicular to said fastening means.

References Cited

UNITED STATES PATENTS

| 1,857,674 | 5/1932 | Zubaty | 73—520X |
| 3,096,657 | 7/1963 | Cohen | 73—517 |

FOREIGN PATENTS

| 22,814 | 1906 | Great Britain | 73—519 |

JAMES J. GILL, Primary Examiner

U.S. Cl. X.R.

73—519